United States Patent [19]

Bauer et al.

[11] Patent Number: 5,567,465
[45] Date of Patent: Oct. 22, 1996

[54] DEHYDRATED PARTICULATE FOOD PRODUCT AND PREPARATION THEREOF

[75] Inventors: Werner Bauer, Lutry; Gerard Masson, Cully, both of Switzerland

[73] Assignee: Nestec S.A., Vevey, Switzerland

[21] Appl. No.: 416,876

[22] PCT Filed: Sep. 6, 1994

[86] PCT No.: PCT/CH94/00175

§ 371 Date: Jul. 6, 1995

§ 102(e) Date: Jul. 6, 1995

[87] PCT Pub. No.: WO95/07029

PCT Pub. Date: Mar. 16, 1995

[30] Foreign Application Priority Data

Sep. 10, 1993 [EP]  European Pat. Off. ............. 93114552

[51] Int. Cl.⁶ .................................................. A23D 7/04
[52] U.S. Cl. ........................ 426/613; 426/640; 426/601
[58] Field of Search .................................. 426/654, 613, 426/89, 96, 285, 591, 601, 47, 330.1, 614, 638, 640

[56] References Cited

U.S. PATENT DOCUMENTS 3,212,906  10/1965  Jones .................................. 426/330.1
3,510,315   5/1970  Hawley ..................................... 426/89
3,520,700   7/1970  Kohl .................................... 426/330.1
3,615,705  10/1971  Kohl .................................... 426/330.1
3,640,731   2/1972  Kaplow ................................ 426/330.1
3,953,611   4/1976  Youngquist ............................. 426/656
4,052,517  10/1977  Youngquist ............................. 426/656
4,061,784  12/1977  Youngquist ............................. 426/656
4,115,592   9/1978  Bergquist ............................... 426/614
4,351,849   9/1982  Meade .................................... 426/658
4,414,240  11/1983  Lee ..................................... 426/330.1
4,572,836   2/1986  Bakal .................................... 426/613
4,861,605   8/1989  Moon ...................................... 426/96
5,283,072   2/1994  Cox ..................................... 426/330.1
5,403,600   4/1995  Reutemann ............................. 426/659
5,418,010   5/1995  Janda ..................................... 426/96
5,462,759  10/1995  Westerbeek ............................. 426/613

*Primary Examiner*—Carolyn Paden
*Attorney, Agent, or Firm*—Vogt & O'Donnell, LLP

[57] ABSTRACT

A dehydrated particulate food product is made by preparing an aqueous mixture containing albumen and a food acid and combining and mixing the aqueous mixture with a fat in amounts sufficient to obtain an emulsion containing albumen and fat in a ratio of between 0.14:1 and 1.5:1 and having a pH below 5. The emulsion is homogenized and then dehydrated.

17 Claims, No Drawings

5,567,465

DEHYDRATED PARTICULATE FOOD PRODUCT AND PREPARATION THEREOF

BACKGROUND OF THE INVENTION

A normal process for preparing mayonnaise consists of producing a mixture comprising egg yolks, mustard, vinegar, salt and pepper, and then adding oil thereto. In such mayonnaise, the oil-in-water emulsion formed is stabilised by the lecithin contained in the egg yolk, through its surface-active properties. The mayonnaise thus obtained nevertheless contains a significant quantity of fat and a high cholesterol content, due principally to the egg yolks and secondarily to the oil used.

U.S. Pat. 5,082,674 proposed a process for preparing, inter alia, dehydrated mayonnaise capable of being reconstituted rapidly through the addition of water. This process consists of preparing a mixture comprising a lyso-phospholipoprotein (LPLP), modified egg yolks and maltodextrin, and then adding a sunflower oil so as to form an emulsion capable of being homogenised and dehydrated by atomization.

Rehydration is effected by the addition of water and enables a product with a texture and taste comparable to those of conventional mayonnaise to be obtained. However, this mayonnaise has the drawback of containing egg yolks, constituents that consumers would like to avoid eating for dietary reasons.

U.S. Pat. No. 3,582,363 concerns a dry composition which can be rehydrated in order to give a salad dressing. This composition consists of a dry mixing of the different ingredients. The drawback of this dry composition is that it may be inhomogeneous and that when rehydrated an unstable product is obtained.

SUMMARY OF THE INVENTION

The object of the present invention is to overcome the above-noted drawbacks and it provide a product of the dehydrated oil-in-water emulsion type, able to give a mayonnaise after the addition of water, the product containing no egg yolk, therefore being low in cholesterol, nor containing maltodextrin or thickening agents or added stabilisers, while offering a remarkable degree of stability.

Accordingly, the present invention provides a particulate dehydrated food product, comprising albumen, a source of food acid, a source of fat and optionally seasonings, the whole having been emulsified, homogenised and then dehydrated, each constituent particle of the said powder having the same composition as the whole, the said food product being able to form, after rehydration, a stable oil-in-water emulsion, with a pH below 5 and an albumen/fat ratio of between 0.14 and 1.5.

Each particle of the dehydrated product of the present invention has an average size of between 50 and 150 microns. The product, in the form of a powder, is used either as a base for mayonnaise, in which case it has a lipid content of between 65 and 85%, or as a salad dressing, in which case it has a lipid content of between 30 and 65%. This product may have a protein content of between 5 and 30%, a carbohydrate content of between 1 and 30%, and a proportion of mineral salts or other secondary ingredients of between 0 and 5%.

A salad dressing is reconstituted with one part of powder to one part of water and a mayonnaise with one part of water to four parts of powder.

Each constituent particle has the above composition of lipids, carbohydrate, proteins and mineral salts.

The present invention provides a process for preparing the product, in which an aqueous mixture comprising a source of albumen and a source of food acid is prepared, and combined and mixed with a fat, with the option of adding seasonings to the aqueous and/or fatty phase. The aqueous mixture and fat are combined in amounts sufficient so as to form an emulsion having a pH below 5 and an albumen/fat ratio of between 0.14 and 1.5. The emulsion is homogenised and the homogenised emulsion obtained is dehydrated.

It was found, surprisingly, that it was possible in accordance with the present invention to obtain a dehydrated oil-in-water emulsion having an acidic pH and able to remain stable following rehydration, without the need to employ stabilising agents such as those in egg yolk, or thickeners such as gums or starches, or emulsifiers such as lecithins.

The present invention is noteworthy for the fact that it makes it possible to obtain, following reconstitution, a product of the mayonnaise type having a reduced cholesterol content, generally less than 10 mg per 100 g of dry product. The present invention is particularly notable in that it enables the use of egg yolk, a very significant source of cholesterol, whose damaging effects on health are well-known, to be completely avoided.

Another advantage of the invention is that it allows easy industrial preparation of a product that will keep for a long time in powder form.

Another advantage is that it enables a product that is quickly and easily reconstituted cold, in particular using tap water, to be obtained.

DETAILED DESCRIPTION OF THE INVENTION

In the rest of the present description, the percentages and amounts are given in terms of weight.

Thus, in order to implement the process, an aqueous phase is first of all prepared comprising a source of albumen and a source of food acid.

The source of albumen comes principally from egg white, which may easily be obtained commercially either in liquid form, possibly concentrated and preferably pasteurised, or in the form of dehydrated powder.

It is also possible to use a mixture of liquid egg white, concentrated or otherwise, and powdered egg white.

It is also possible to add milk proteins such as skimmed milk in liquid and/or powder form, or a concentrate of whey proteins, for example in dehydrated form, or vegetable proteins, so as to increase the dry matter content of the emulsion obtained, which has the effect of increasing the viscosity of the emulsion and assisting the atomization and drying stage, while enhancing the texture of the final product. It is possible to add up to 1 part of skimmed milk or concentrated whey protein dry matter per part of albumen dry matter.

The source of food acid may be citric acid and/or acetic acid, coming, for example, from lemon juice or vinegar.

It is also possible to add to the said aqueous phase food seasonings, in liquid, paste or powder form, such as mustard, salt, pepper, spices, egg flavour, or any other flavouring desired by the consumer such as, for example, flavours or juices or extracts of fruits and/or vegetables.

It was found, surprisingly, that the addition of seasonings does not bring about a destabilisation of the emulsion, in the form of a phase separation, which offers the advantage of being able to season beforehand the emulsion to be dehydrated, so as to obtain a reconstituted product that can be seasoned according to the taste of consumers.

It is also possible to enrich the aqueous phase with water-soluble vitamins and/or mineral salts.

This mixture may be prepared at any temperature, the dissolving of any powdered skimmed milk in the liquid egg white taking place faster between 30° and 40° C. It is also possible to prepare this mixture at a lower temperature, around 4° to 10° C., so as to maintain good conditions of bacteriological safety.

An aqueous phase is thus obtained, to which it is not necessary to add water, with a dry matter content of around 20 to 50%.

At the same time, a fatty phase is prepared, which may comprise one or more fats of animal or vegetable origin, such as sunflower, soya, olive, peanut, rapeseed, canola and/or corn oil, and may also contain liposoluble vitamins or any other liposoluble ingredient such as flavourings, aromatic oils and/or food colourings and/or natural antioxidants.

The fatty phase is added to the aqueous phase in such quantities as to give an albumen/fat ratio of between 0.14 and 1.5.

It has been found that when this ratio is less than 0.14, the emulsion obtained is not sufficiently stable, and that when this ratio is greater than 1.5, on the one hand the emulsion contains too much dry matter and becomes difficult to pump, and, on the other hand, the final product after reconstitution has an impaired taste and appearance, as well as a grainy, chalky or floury texture in the mouth, probably due to the presence of too high a quantity of proteins.

Thus the ratio as specified in the present invention guarantees the good homogeneity and stability of the emulsion, and also permits an excellent reconstitution of the final product simply by adding water.

An emulsion is then formed by slowly mixing the aqueous and fatty phases, for example gently incorporating the fatty phase into the aqueous phase, while maintaining constant stirring and, preferably, a temperature of around 4° to 10° C., equally for bacteriological reasons.

An oil-in-water emulsion is thus obtained, with a pH below 5, the exact figure depending on the composition, but generally between 2.9 and 4.5, containing no egg yolk, and having an albumen/fat ratio of between 0.14 and 1.5.

The dry matter content of the said emulsion is preferably between 20 and 50% so as to permit pumping, homogenisation and dehydration.

The emulsion is then homogenised, under high pressure, in order to reduce the size of the droplets of the fatty phase to around 1 μm, or even less.

It has been observed that homogenisation allows the rehydration qualities of the dehydrated powder to be improved, as well as its functional properties such as, for example, its ability to form a firm and stable gel, which is important in cases where the aim is to reconstitute a product having the appearance, taste and consistency of mayonnaise.

A two-stage homogenizer may be employed in the usual way. Nevertheless, the precaution may be taken of not going above too high a pressure, of around 350 bars, so as to avoid a denaturation of the proteins which would cause a loss of functionality and lead to an irreversible phase separation of the emulsion.

Homogenisation may be carried out at any temperature well below the coagulation temperature of egg white, preferably at a temperature of 4° to 40° C., and ideally 4° to 10° C.

The emulsion thus homogenised is then dehydrated by means of any known process, such as freeze drying or atomization.

A powder that may optionally be agglomerated by any known process is thus obtained.

In this way, a powdered product is obtained which can be used directly, after reconstitution by the addition of any food liquid such as water, vinegar, wine, juices of fruits or vegetables, stocks, milk, cream or even yoghurt for example, or any other substance able to bring about rehydration, as a base for salad dressing, mayonnaise or dressing.

The subsequent use made of the reconstituted product depends principally on the quantity of liquid added to it, and therefore on its viscosity, which determines its consistency, firmer as a base for mayonnaise, more or less liquid as a base for salad dressing.

Generally, by adding one part by weight of water to 1 to 4 parts by weight of the said product in powder form, it is possible to reconstitute an edible product having the consistency of salad dressing or mayonnaise.

The powdered product according to the invention also has the advantage that it may be immediately reconstituted cold, in a liquid such as water, and that it permits the preparation of a homogenous and stable emulsion, without phase separation.

The product obtained following rehydration contains little cholesterol, coming principally from the fat source and possibly from seasonings, and is therefore nutritionally wholesome, whilst having a texture and taste comparable to salad dressings or mayonnaises produced in a conventional manner.

Moreover, the reconstituted product obtained is very stable and can be kept for 2 to 3 days at room temperature and 1 to 2 weeks at refrigerator temperature, without any phase separation or other deterioration, microbiological for example, being observed.

It is possible to add to it, following reconstitution, food ingredients such as salts, essential or aromatic vegetable or animal oils, fruit or vegetable juices, spices, creams and yoghurts, or any other condiment in liquid, paste or powder form, or any other flavouring, so as to personalise the said final product to the taste of the consumer, without causing any destabilisation of the product.

EXAMPLES

The invention is illustrated in greater detail in the following example embodiments.

Example 1

A first mixture is prepared comprising 90 kg of pasteurised liquid egg white and 3 kg of powdered skimmed milk. This aqueous phase is mixed for 20 minutes at 10° C. 8 kg of sunflower oil, previously cooled to 10° C., is added to this aqueous phase while maintaining constant stirring so as to obtain an oil-in-water emulsion.

The emulsion thus obtained is homogenised so as to obtain a fine stable emulsion with a particle size of 0.35 μm and a dry matter content of 22.5%.

The ratio of total proteins to lipids is 1.5 and the ratio of albumen to total proteins is 0.75.

The said emulsion is dehydrated by atomization in the usual manner.

The powdered product thus obtained has a dry matter content of 97%.

Its composition is as follows: proteins 52%, carbohydrates 10%, lipids 34%, mineral salts 1%.

Moreover, 100 g of powdered product contains 7 mg of cholesterol.

The product is reconstituted by adding 75 ml of water to 25 g of product in powder form. A base for salad dressing is obtained, to which may also be added vinegar, mustard, salt and spices, or any other seasoning.

The product obtained is comparable, in its texture and taste, to those obtained in the traditional manner.

It is also possible to reconstitute the product by adding 150 ml of water to 50 g of powder, and then adding 5 g of mustard and 3 g of salt to the reconstituted emulsion and, finally, 300 g of table vegetable oil and 30 g of vinegar.

A mayonnaise having an attractive appearance, a good smell of egg, and a suitable texture and taste is thus obtained.

Example 2

A first mixture is prepared comprising 26 g of mustard, 44 g of vinegar, 80 g of lemon juice, 5 g of Worcester sauce and 2 g of salt, which is mixed for about 30 minutes at room temperature. This first mixture is added to 570 g of pasteurised liquid egg white and 15 g of powdered skimmed milk. This aqueous phase is mixed for 30 minutes at 10° C. To this aqueous phase is added 260 g of sunflower oil previously cooled to 10° C., while maintaining constant stirring so as to obtain an oil-in-water emulsion, having a pH of around 3.8–4.2.

The emulsion thus obtained is thus homogenized so as to obtain a fine stable emulsion with a particle size of less than 6 μm and a dry matter content of 36%.

The said emulsion is dehydrated by freeze drying in the usual manner.

The powdered product thus obtained has a dry matter content of 98%.

Its composition is as follows: proteins 20%, carbohydrates 4%, lipids 72%, mineral salts 2%.

The ratio of total proteins to lipids is 0.3 and the ratio of albumen to total proteins is 0.8.

The product is reconstituted by the addition of one part of water to one part of product. A base for mayonnaise having a pH of 4 is obtained, a base to which may be added sunflower oil, for example, in order to obtain a mayonnaise which is comparable, in terms of texture and taste, to those obtained in the traditional manner.

The base thus prepared remains stable, without phase separation, for at least 8 hours.

The cholesterol content of the mayonnaise thus obtained is of the order of 5 mg per 100 g whilst it is at least 180 mg/100 g for a normal mayonnaise prepared by the housewife.

The product may also be reconstituted by adding one part of ketchup to one part of powder. A sauce of the mayonnaise type is thus obtained which is tomato coloured and flavoured, has a pH of 4.5/5.0, and remains stable for at least 8 hours.

The cholesterol content of the said base is below 5 mg per 100 g of product.

Example 3

A first mixture is prepared comprising 4.8 kg of liquid egg white, 0.17 kg of powdered egg white, 0.17 kg of powdered skimmed milk, 0.85 kg of vinegar and 0.01 kg of sodium chloride.

This aqueous phase is mixed for 30 minutes at 10° C. To this aqueous phase is added 4.0 kg of soya oil previously cooled to 10° C., while maintaining constant stirring so as to obtain an oil-in-water emulsion having a pH of around 3.8–4.2.

The emulsion thus obtained is homogenized so as to obtain a fine stable emulsion with a particle size below 5 μm and having a dry matter content of 50%.

The said emulsion is dehydrated by freeze drying in the usual manner.

The powdered product thus obtained has a dry matter content 98%.

Its composition is as follows: proteins 15% carbohydrates 3%, lipids 79%, mineral salts 1%.

The ratio of total proteins to lipids is 0.2 and the ratio of albumen to total proteins is 0.6.

The product is reconstituted by the addition of 2 parts of water to one part of product. A base for mayonnaise having a pH of 4 is obtained, a base to which may be added sunflower oil, for example, in order to obtain a mayonnaise which is comparable, in terms of texture and taste, to those obtained in the traditional manner.

The base thus prepared remains stable, without phase separation, for at least 8 hours.

The cholesterol content of the mayonnaise thus obtained is below 5 mg per 100 g of product.

It is also possible to reconstitute the product by adding 3 parts of water to one part of powder. A salad dressing is thus obtained, to which may be added yoghurt for example, which has a pH of 4.5/5.0, and which remains stable for at least 8 hours.

The cholesterol content of the said base is around 3 mg per 100 g of product.

Example 4 (Keeping tests)

The powdered product obtained according to Example 2 is packed in 250 ml metal cans.

These cans are kept for a certain time at room temperature, and a sample of the product is reconstituted by the addition of water (1 part of product per part of water).

The reconstituted samples are tested by a panel of 15 trained tasters.

The following results are obtained:

for the dry product after 5 months of storage: the product keeps well and is easily rehydrated. The reconstituted product has a taste, appearance and texture comparable to those of a mayonnaise prepared from the fresh dried product.

for a product reconstituted from a powdered product stored open for 2 months, a slight change in taste is noted.

We claim:

1. A process for preparing a dehydrated particulate food product comprising:

preparing an aqueous mixture by mixing albumen and a food acid;

combining and mixing the aqueous mixture with fat in amounts sufficient to obtain an emulsion containing albumen and fat in a ratio of between 0.14:1 and 1.5:1 and having a pH below 5;

homogenizing the emulsion; and dehydrating the homogenized emulsion to obtain a dehydrated particulate food product.

2. A process according to claim 1 wherein the aqueous mixture further comprises vegetable protein and carbohydrate.

3. A process according to claim 1 wherein the aqueous mixture further comprises milk protein and carbohydrate.

4. A process according to claim 2 or 3 wherein the aqueous mixture and fat are combined in amounts so that the dehydrated product has a fat content of 30% to 85% by weight, a protein content of 5% to 30% by weight and a carbohydrate content of 1% to 30% by weight.

5. A process according to claim 4 wherein the aqueous mixture and fat are combined in amounts so that the dehydrated product has a fat content of 65% to 85% by weight.

6. A process according to claim 4 wherein the aqueous mixture and fat are combined in amounts so that the dehydrated product has a fat content of 30% to 65%.

7. A dehydrated particulate food product obtained from the process of claim 4.

8. A process according to claim 1 wherein cholesterol-containing materials incorporated into the emulsion are present in amounts such that the dehydrated product contains less than 10 mg cholesterol per 100 g of dehydrated product.

9. A dehydrated particulate food product obtained from the process of claim 1.

10. A dehydrated particulate food product comprising individual dehydrated particles, wherein the individual particles comprise albumen, fat and a food acid, wherein the particles have an albumen-to-fat ratio of between 0.14 and 1.5, and wherein the food acid is present in an amount so that, upon hydration of the particles to prepare an emulsion base product, the emulsion base product has a pH less than 5.

11. A product according to claim 10 wherein the particles further comprise vegetable protein and carbohydrate.

12. A product according to claim 10 wherein the particles further comprise milk protein and carbohydrate.

13. A product according to claim 11 or 12 having a fat content of 30% to 85% by weight, a protein content of 5% to 30% by weight and a carbohydrate content of 1% to 30% by weight.

14. A product according to claim 13 having a lipid content of 30% to 65% by weight.

15. A product according to claim 13 having a lipid content of 65% to 85% by weight.

16. A product according to claim 10 wherein the particles have an average size of 50 microns to 150 microns.

17. A product according to claim 10 having a cholesterol content of less than 10 mg per 100 g of dehydrated product.

* * * * *